United States Patent [19]

Ikeda

[11] Patent Number: 5,719,853
[45] Date of Patent: Feb. 17, 1998

[54] CONGESTION CONTROL METHOD IN AN ATM NETWORK BASED ON THRESHOLD VALUES OF NODE QUEUE LENGTH

[75] Inventor: Chinatsu Ikeda, Tokyo, Japan

[73] Assignee: NEC Corporation, Tokyo, Japan

[21] Appl. No.: 636,274

[22] Filed: Apr. 29, 1996

Related U.S. Application Data

[63] Continuation of Ser. No. 360,329, Dec. 21, 1994, abandoned.

[30] Foreign Application Priority Data

Dec. 22, 1993 [JP] Japan ..................... 5-324989

[51] Int. Cl.$^6$ .................................................... H04J 3/22
[52] U.S. Cl. ................................................... 370/229
[58] Field of Search ................... 395/200.01, 229, 395/230, 231, 232

[56] References Cited

U.S. PATENT DOCUMENTS

| | | | |
|---|---|---|---|
| 5,062,106 | 10/1991 | Yamazaki et al. | 370/397 |
| 5,253,248 | 10/1993 | Dravida et al. | 370/228 |
| 5,287,535 | 2/1994 | Sakagawa et al. | 370/389 |
| 5,367,523 | 11/1994 | Chang et al. | 370/235 |
| 5,457,687 | 10/1995 | Newman | 370/232 |

OTHER PUBLICATIONS

Habib et al.; Access Flow Control Algorithms in Broadband Networks; MILCOM; 1992; pp. 252–256.

Ikeda et al.; Adaptive Congestion Control Schemes for ATM LANs; INFOCOM 1994; 1994; pp. 829–838.

*IEEE in Houston, Globecom '93;* IEEE Global Telecommunications Conf. ISBN 0-7803-0917-0, 1993 New York pp. 719-723 vol. 2. P. Newman.; "Backward explicit congestion notification for ATM local area networks".

*Electronics Letters,* 13, Feb. 1992, UK, vol. 28 No. 4, ISSN 0013-5194, pp. 425–427 Abbas M et al. "Local congestion control scheme using priority jumping technique with movable-threshold".

Aboul–Magd et al., "Incorporating Congestion Feedback in B–ISDN Traffic Management Strategy", XIV International Switching Symposium, vol. 2, Oct. 1992, pp. 12–16.

Boudec, et al., "Flight of the Falcon", IEEE Communications Magazine, Feb. 1993, pp. 50–56.

*Primary Examiner*—Parshotam S. Lall
*Assistant Examiner*—Kenneth R. Coulter
*Attorney, Agent, or Firm*—Foley & Lardner

[57] ABSTRACT

In the congestion control method, when a queue length of a node in a virtual channel set up in an ATM network is a first threshold or more, a source terminal in the virtual channel is instructed to decrease a transmission rate. When the queue length of a node is a second threshold or more which is greater than the first threshold, there is halted the transmission of data cells from the preceding nodes or source terminals to the bottleneck node. In a method of decreasing the transmission rate, congestion data is added to the header of a data cell passing through a node where the data cell queue is the first threshold or more, and the destination terminal which has received the data cell containing the congestion data transmits a rate decreasing control cell to the source terminal through the network. Receiving the rate decreasing control cell, the source terminal lowers the transmission rate. In another way, in a node where a cell queue length is the first threshold or more, a rate decreasing control cell is generated and transmitted to the source terminal.

24 Claims, 11 Drawing Sheets

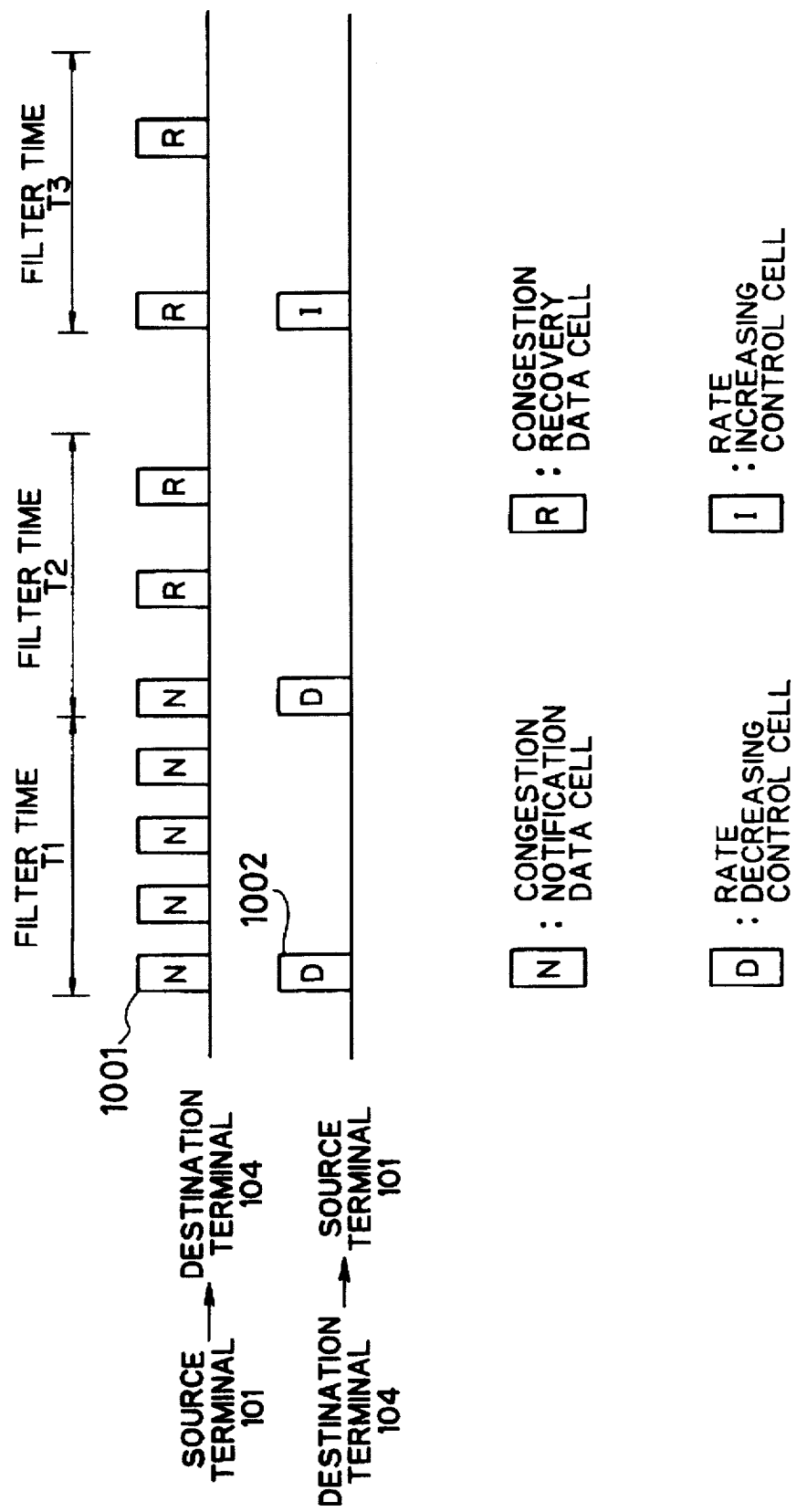

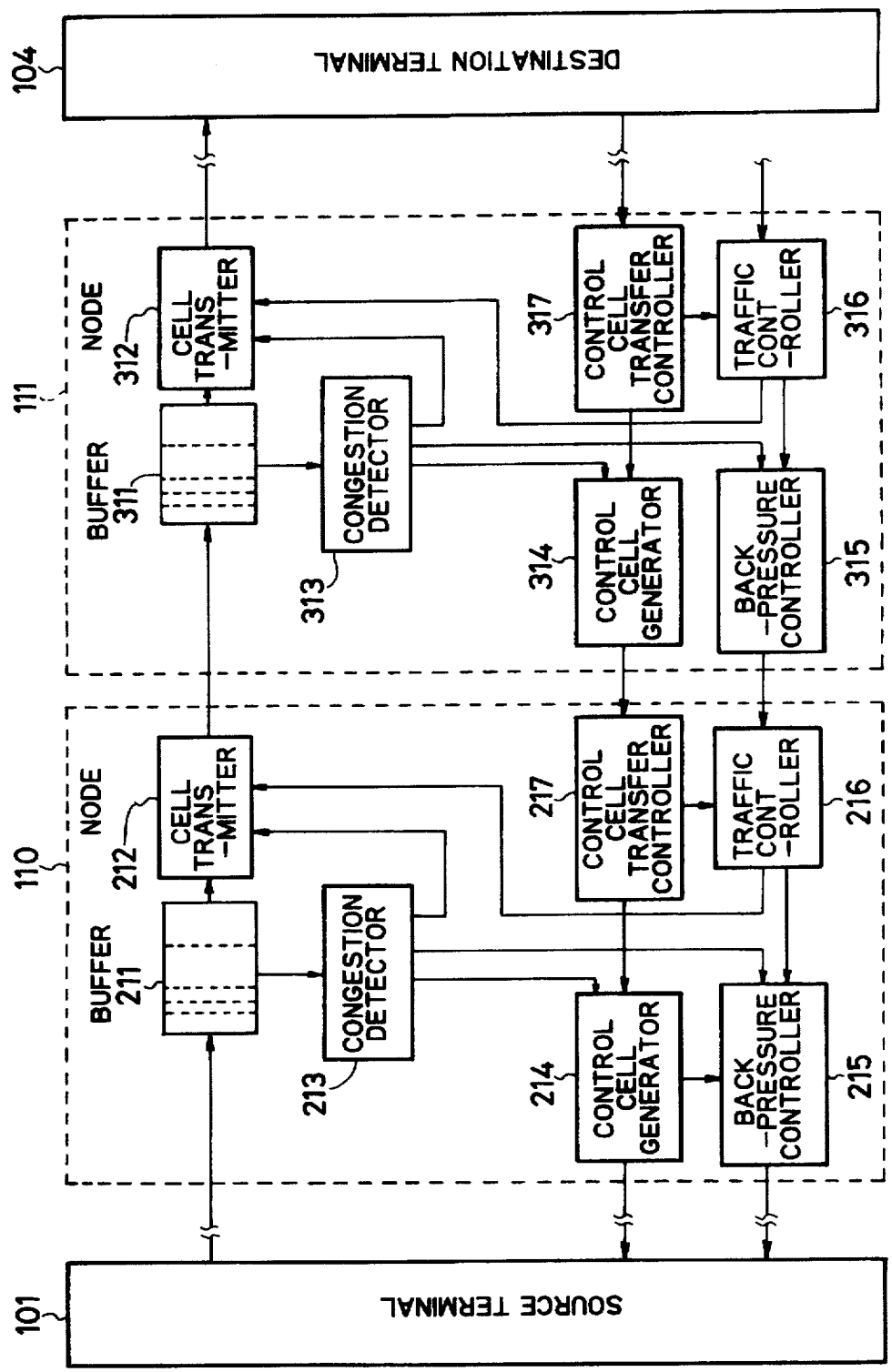

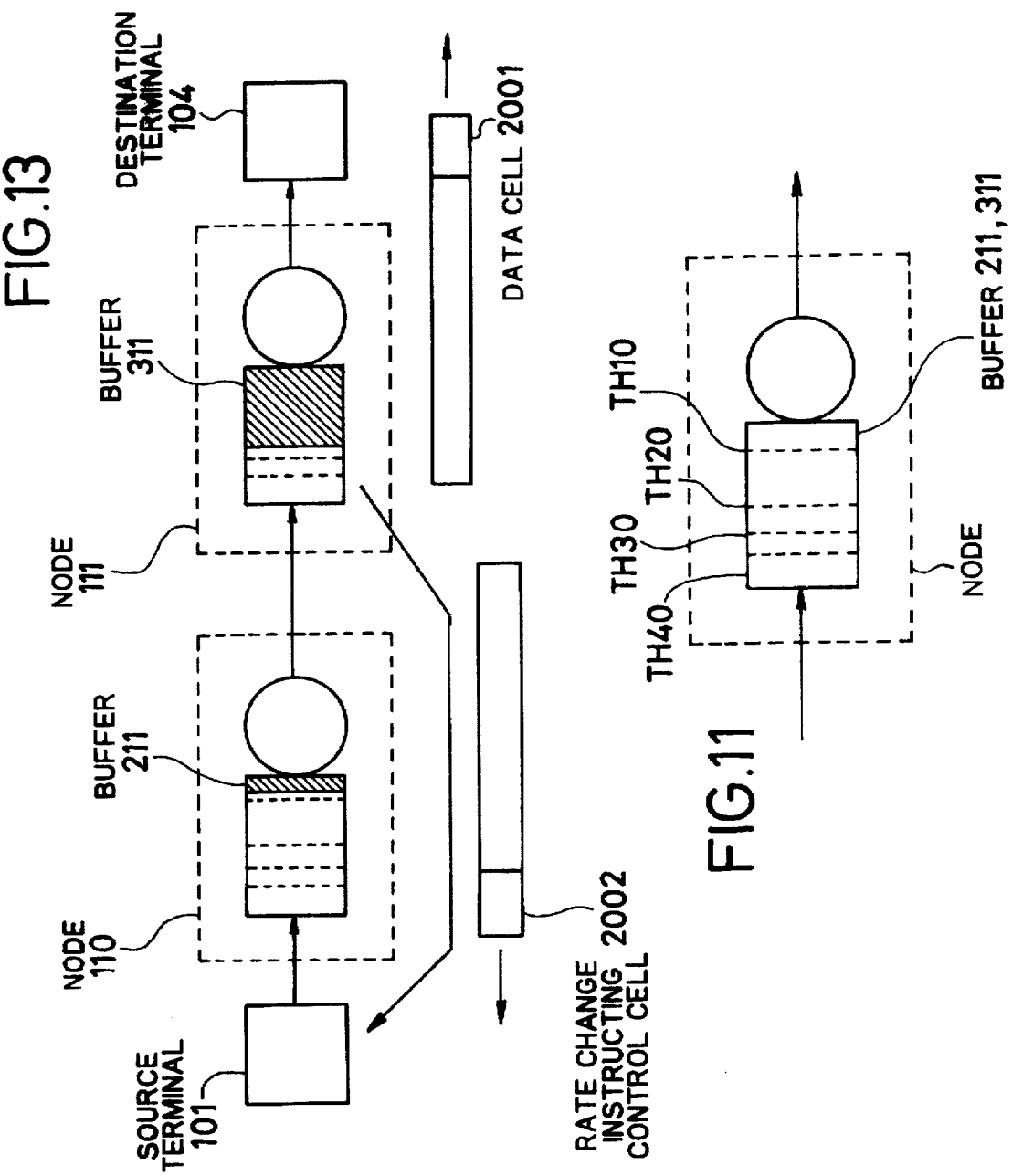

CONGESTION CONTROL METHOD IN AN ATM NETWORK BASED ON THRESHOLD VALUES OF NODE QUEUE LENGTH

This application is a continuation of application Ser. No. 08/360,329, filed Dec. 21, 1994, now abandoned.

BACKGROUND OF THE INVENTION

1. Field of the Invention

The present invention relates to an asynchronous transfer mode (ATM) network system, and more specifically to a congestion control method executed on the basis of the length of a queue in each node in the ATM network.

2. Description of the Prior Art

Several congestion control systems have been proposed, including FECN (Forward Explicit Congestion Notification) and BECN (Backward Explicit Congestion Notification). The congestion control of these systems is performed by monitoring the length of a node queue at all times. When the length of a queue exceeds a preset threshold in a node, a source lowers its transmission rate by decreasing the window size. Such a congestion control is disclosed by Aboul-Magd et al., in the paper "Incorporating Congestion Feedback in B-ISDN Traffic Management Strategy", International Switching Symposium, October 1992, Vol. 2.

In the FECN system, a bottleneck node writes congestion information onto the header of a data packet passing through the node, and a destination terminal which has received that data packet sends a control packet indicative of congestion back to a source terminal. Receiving the control packet from the destination terminal through the network, the source terminal lowers the transmission rate of data packets.

In the BECN system, a node which detects congestion therein transmits a control packet indicative of the congestion back to a preceding node which in turn transfers the control packet to a further preceding node and then to the source terminal. Receiving the control packet, the source terminal lowers the transmission rate of data packets. For this, a reference is disclosed by Newman in "Backward Explicit Congestion Notification for ATM Local Area Network", 1993 IEEE.

Another congestion control mechanism is known as a backpressure method disclosed in "Flight of the FALCON" (IEEE Communications Magazine February 1993) by J. L. Boudec et al. The backpressure method is to send back a backpressure control cell from a bottleneck node to a preceding node to temporarily stop the cell transmission to the bottleneck node, so that ATM cells are prevented from being discarded due to buffer overflow in the bottleneck node.

The conventional congestion control mechanisms, however, have the following disadvantages. In the FECN and BECN methods described above, after receiving a control packet indicative of congestion, the source terminal lowers its transmission rate. Therefore, it suffers from a difficulty that, when there is a substantial transmission delay between the source and the destination, some data packets were discarded owing to buffer overflow until the control packet indicative of congestion reaches the source terminal.

Further, these systems, which reduce the number of transmission data packets by controlling a window size, require control in a higher rank layer capable of treating the window.

In the backpressure method, a node in a congestion state instructs a preceding node to halt transmission, so that congestion is produced also in the preceding node and hence there is a possibility that there might be produced such successive transmission halt states. For this, even data cells not transmitted to the node where the congestion state is first produced are stopped, resulting in a severely reduced throughput of the network. Particularly in a ring network, there is a possibility that a deadlock might occur where no data cell can come into or go out from the network.

SUMMARY OF THE INVENTION

To solve the problems with the prior art, it is an object of the present invention to provide a congestion control method capable of preventing any ATM cell from being lost due to buffer overflow in a node and of achieving high availability of the ATM network.

It is another object of the present invention to provide a congestion control method capable of improving a network throughput and availability.

In accordance with the congestion control method of the present invention, when a queue length of a node in a virtual channel set up in an ATM network is a first threshold or more, a source terminal in the virtual channel is instructed to decrease a transmission rate. When the queue length is a second threshold or more which is greater than the first threshold, there is halted the transmission of data cells from the preceding nodes or source terminals to the bottleneck node.

The method of decreasing the transmission rate of the source terminal comprises two ways. In the first way, congestion data is added to the header of a data cell passing through a node where the data cell queue is the first threshold or more, and the destination terminal which has received the data cell containing the congestion data transmits a rate decreasing control cell to the source terminal through the network. Receiving the rate decreasing control cell, the source terminal lowers the transmission rate. It is herein desirable for preventing the traffic of control cells from being increased to regulating the transmission timing of control cells in the rate of one time within a predetermined filter time.

In the second way, in a node where a cell queue length is the first threshold or more, a rate decreasing control cell is generated and transmitted to the source terminal. Receiving the rate decreasing control cell, the source terminal decreases the transmission rate of data cells.

In accordance with the present invention, the first threshold indicates that congestion begins to be produced in the network, and the transmission rate of the source terminal is decreased for each channel including a node where the congestion is produced. When the congestion is nevertheless increased and exceeds a second threshold, transmission from preceding nodes to that node is instructed to be temporarily halted. Accordingly, even when a transmission delay through the network is greater, there is sharply reduced the possibility that some data packets were discarded owing to buffer overflow. Additionally, since the transmission rate of the source terminal is decreased before the transmission is halted, there is sharply reduced the possibility that the transmission becomes impossible as in the prior art when the transmission is halted.

BRIEF DESCRIPTION OF THE DRAWINGS

The above and other objects, features and advantages of the present invention will become more apparent from the following description when taken in conjunction with the accompanying drawings in which preferred embodiments of the present invention are shown by way of illustrative examples.

FIG. 9 is a timing chart illustrating a transmission timing of a control cell in a destination terminal;

FIG. 10 is a schematic block diagram illustrating a node in the ATM network according to a second embodiment of the present invention;

FIG. 11 is a diagrammatic view illustrating thresholds preset in a buffer of the node in FIG. 10;

FIG. 13 is a schematic block diagram illustrating a decrease operation of a transmission rate in the second embodiment.

DETAILED DESCRIPTION OF THE PREFERRED EMBODIMENTS

Figure 1:
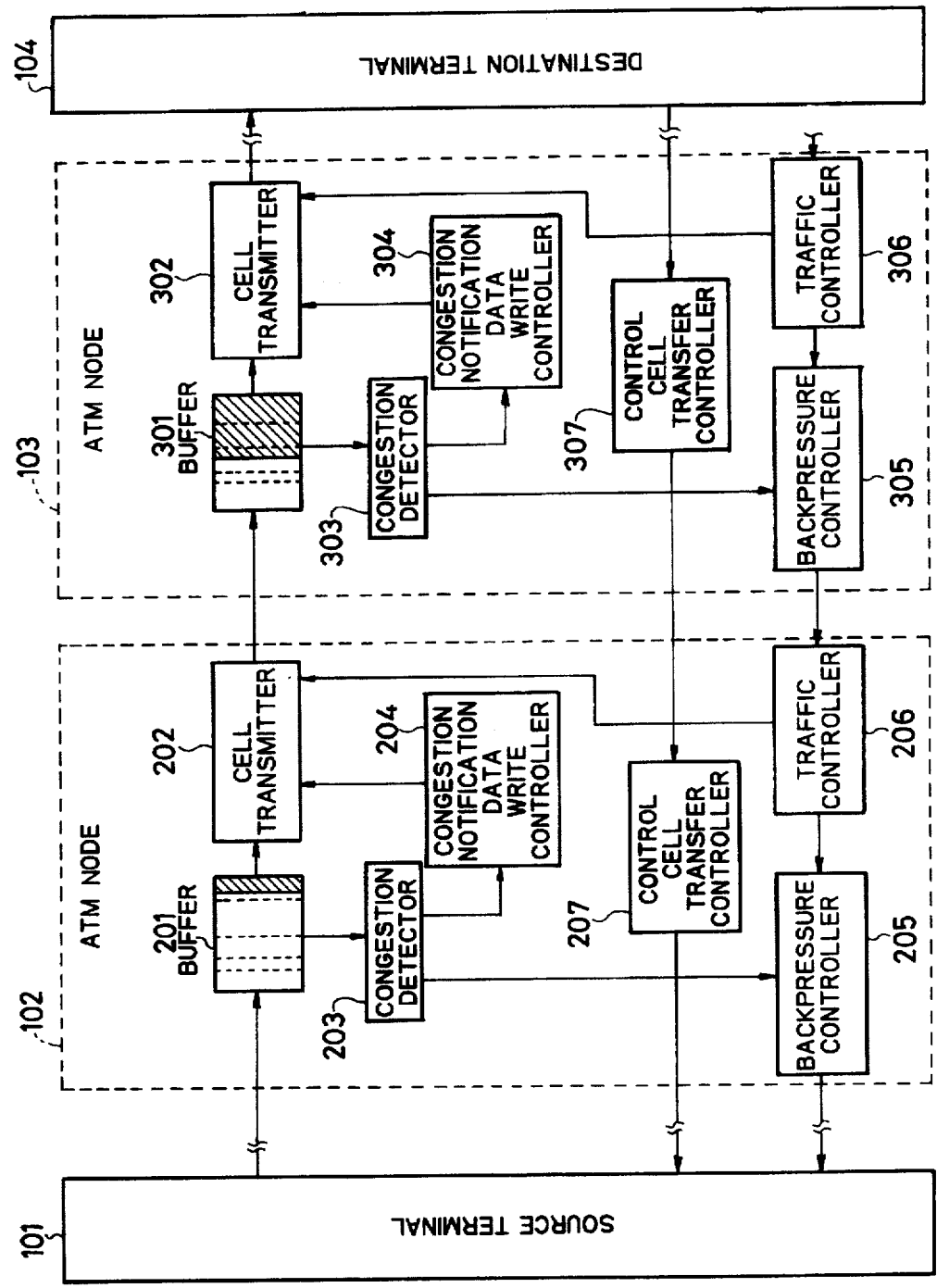
FIG. 1 is a schematic block diagram illustrating an arrangement of a node in an ATM network according to a first embodiment of the present invention.

It is assumed that a virtual channel (VC) is set up between a source terminal 101 and a destination terminal 104 for data transfer as illustrated in FIG. 1. The virtual channel is formed through a plurality of ATM nodes in an ATM network, but in the present embodiment two nodes 102 and 103 thereamong are illustrated in FIG. 1. For simplicity of the drawing, there are omitted other nodes to which the nodes 102 and 103 are connected through respective links, and there are further omitted other devices such as a cell reception processing unit and switches in the node.

Nodes in the ATM network have the same circuit construction. Described in the node 102 as an example, a buffer 201 of the node 102 stores data cells which are received from preceding nodes or source terminals and are waiting to be transmitted to following nodes or destination terminals.

The buffer 201 represents buffers associated with data cell queues in the node 102, which may be a common buffer, or a plurality of input buffers or output buffers depending upon the arrangement of a node. In the following description, the buffer 201 is to store data cells transmitted through the virtual channel set up between a source terminal 101 and a destination terminal 104. The data cells are transmitted from the buffer 201 to the following node 103 by a cell transmitter 202.

A queue length of the buffer 201 is monitored by a congestion detector 203. The congestion detector 203 generates a congestion detection signal by comparing the queue length to four thresholds TH1-TH4 previously set as described later. Based on the congestion detection signal, a congestion notification data write controller 204 writes congestion notification (CN) data onto the header of a data cell passing the cell transmitter 202. A backpressure controller 205 transmits a backpressure control cell indicative of temporal transmission halt to the preceding nodes or the source terminals based on the congestion detection signal.

A traffic controller 206, as receiving a backpressure control cell from the following node 103, outputs to the cell transmitter 202 a control signal of temporarily halting the data cell transmission to the node 103. A control cell transfer controller 207 transfers a control cell received from the following node 103 to the preceding node or the source terminal 101 in the virtual channel.

Figure 2:
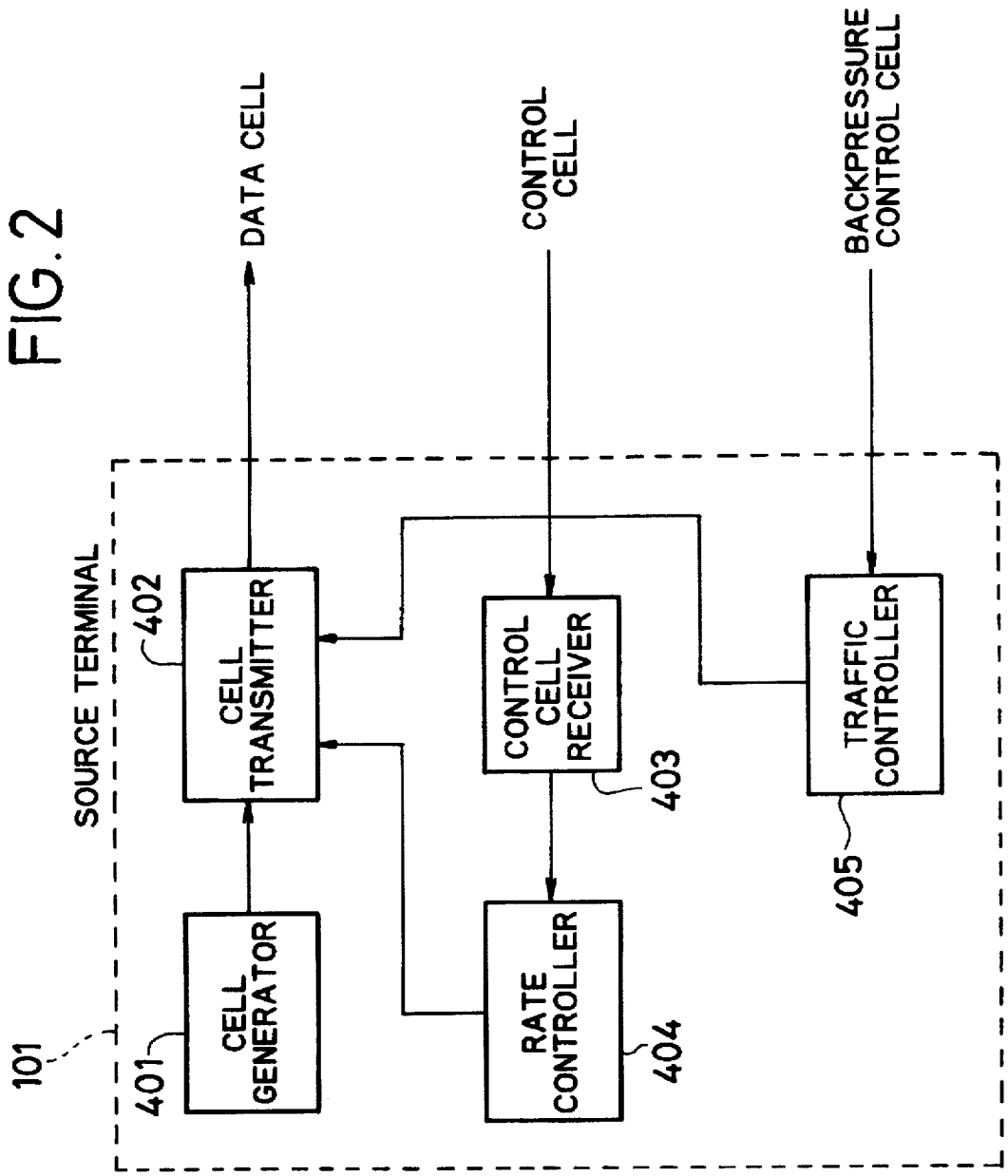
FIG. 2 is a partial block diagram illustrating an arrangement of a source terminal in the ATM network of FIG. 1.

As illustrated in FIG. 2, the source terminal 101 includes a cell generator 401 and a cell transmitter 402. The cell generator 401 generates data cells to be transmitted and outputs them to the cell transmitter 402 which in turn transmits the data cells to the ATM network. A control cell receiver 403 receives from the ATM network the control cell transmitted by the destination terminal 104, and outputs the control information of the control cell to a transmission rate controller 404. According to the control information, the transmission rate controller 404 controls the cell transmitter 402 such that the cell transmission rate is decreased or increased. A traffic controller 405, as receiving the backpressure control cell from the following node, outputs to the cell transmitter 402 a control signal of temporarily halting the cell transmission.

Figure 3:
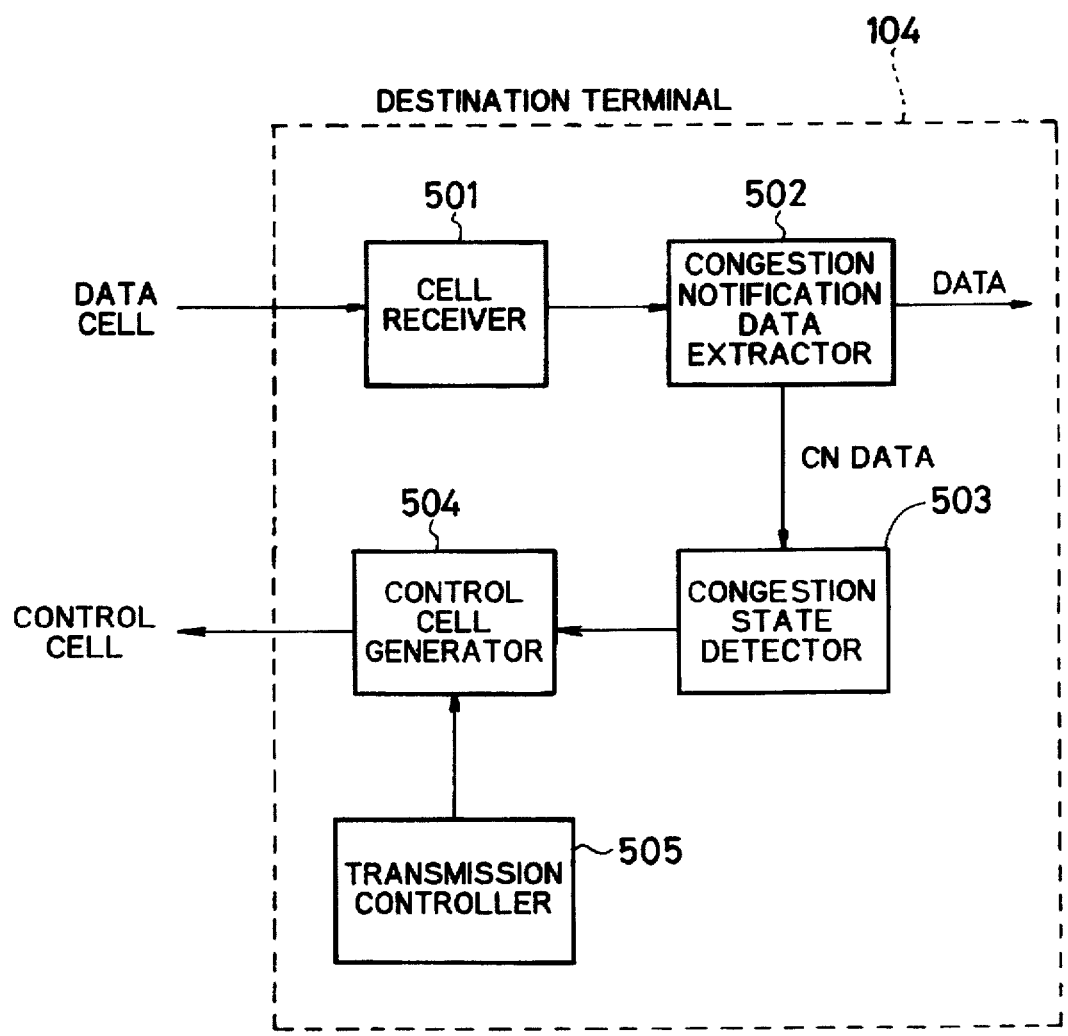
FIG. 3 is a partial block diagram illustrating an arrangement of a destination terminal in the ATM network of FIG. 1.

As illustrated in FIG. 3, the destination terminal 104 is comprised of a cell receiver 501 for receiving data cells and a congestion notification data extractor 502 for extracting congestion notification (CN) data from the header of a received cell. Inputting the CN data, a congestion state detector 503 detects a node queue state indicating congestion or congestion recovery between the source terminal 101 and the destination terminal 104, and outputs a detection signal to a control cell generator 504. According to the detection signal indicative of the node queue state, the control cell generator 504 generates a control cell conveying control information indicative of a decrease or an increase of transmission rate and transmits back the control cell to the source terminal 101.

Figure 4:
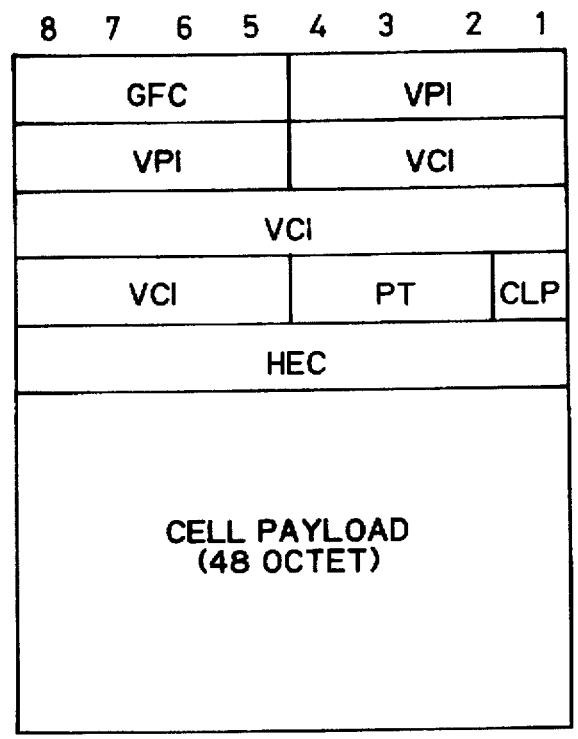
FIG. 4 is a diagrammatic view illustrating a format of an ATM cell.

Referring to FIG. 4, a format of an ATM cell is illustrated. CN data which indicates any of congestion or congestion recovery in each node is written onto a PT( Payload Type ) field. A value indicative of the congestion recovery is initially written onto the PT field.

Figure 5:
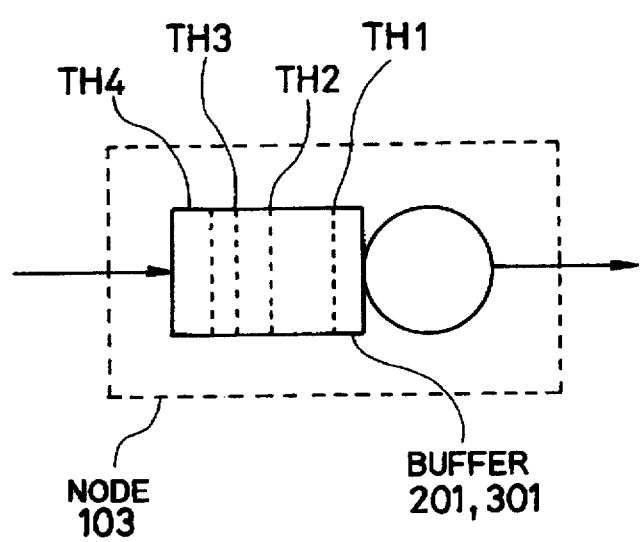
FIG. 5 is a diagrammatic view illustrating thresholds preset in a buffer of a node in FIG. 1.

AS illustrated in FIG. 5, four thresholds TH1-TH4 for a queue length are previously set in a buffer in each node. The threshold TH1 has a value for judging the congestion recovery, the threshold TH2 for judging the congestion, the threshold TH3 for judging restart of the transmission, and the threshold TH4 for judging halt of the transmission. These thresholds satisfy the following relation: TH1=<TH2<TH3=<TH4.

Figure 6:
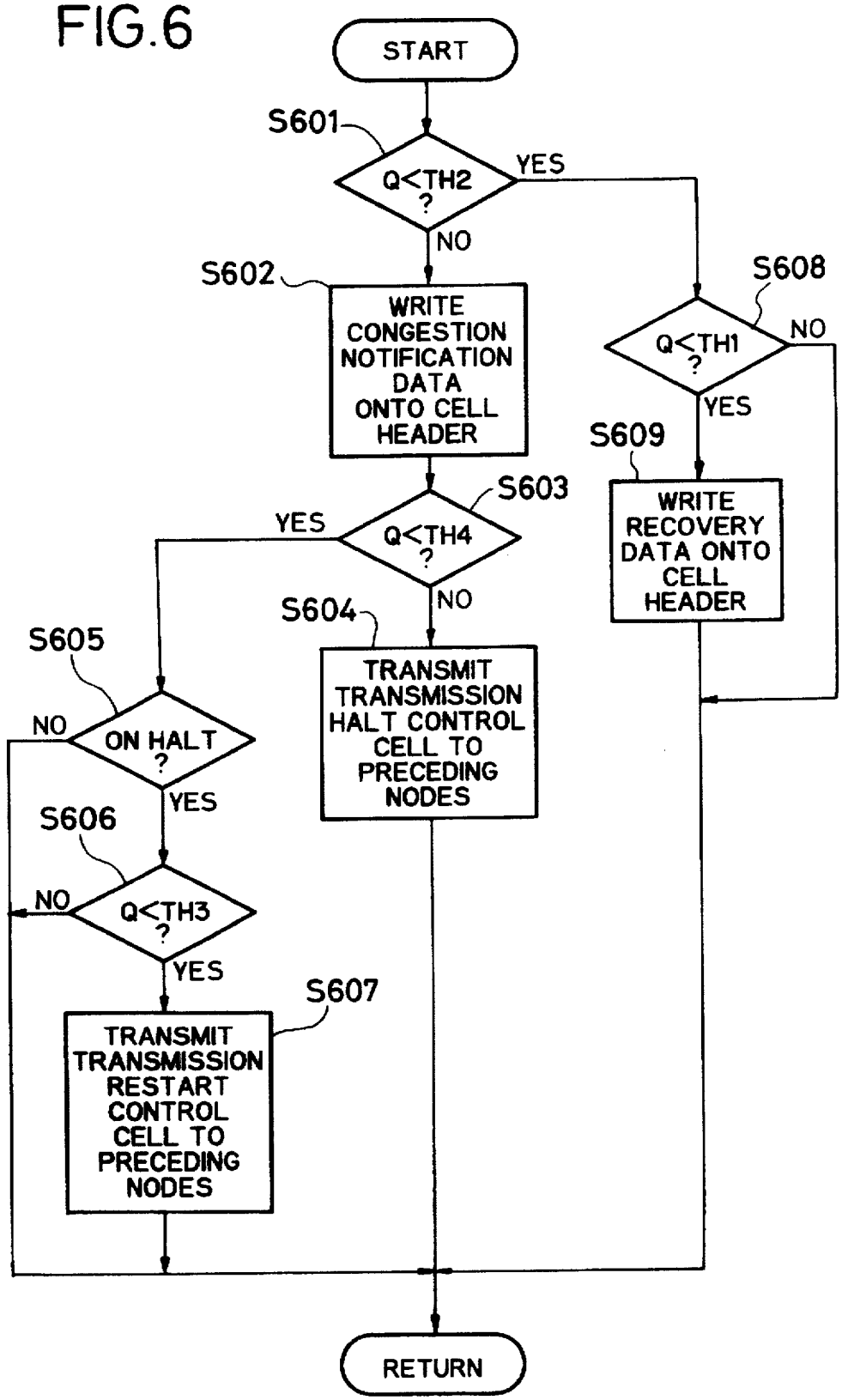
FIG. 6 is a flow chart illustrating a congestion control method according to the first embodiment of the present invention.

Referring to FIG. 6, an operation of each node in the present embodiment will be described. It is herein noted that a control flow of FIG. 6 is a subroutine of a main control flow (not shown) in each node, which is repeatedly executed at predetermined intervals.

In a certain node, the congestion detector checks whether or not a queue length Q of data cells stored in the buffer is smaller than the threshold TH2 (Step S601). If the queue length Q is not smaller than the threshold TH2, the congestion detector determines that the node is in a congestion state, and the CN data '1' indicative of congestion is written onto the PT field of the header of a data cell passing through the node (S602).

Subsequently, the congestion detector checks whether or not the queue length Q is smaller than the threshold TH4 (S603). If the queue length Q is not smaller than the threshold TH4, it is judged to be excessive congestion, and a transmission halt (backpressure) control cell is transmitted to preceding nodes or the source terminals (S604), and the control is returned to the main control flow.

If the queue length Q is smaller than the threshold TH4 (YES in step S603), it is checked whether or not the transmission is on halt (S605). If the transmission is on halt, it is further checked whether or not the queue length Q is smaller than the threshold TH3 (S606). If the queue length Q is smaller than the threshold TH3, a transmission restart control cell is transmitted to the preceding nodes for releasing on-halt transmission (S607). If the transmission is not on halt (NO in S605), the control is returned to the main control flow in the state where the processing in step S602 is continued and is started from the step S601 in the next timing. If the queue length Q is smaller than the threshold TH3 (NO in step S606), the control is returned to the main control flow with the transmission being kept on halt.

If the queue length Q is smaller than the threshold TH2 (YES in step S601), it is checked whether or not the queue length Q is smaller than the threshold TH1 (S608). If the queue length Q is smaller than the threshold TH1, the congestion is judged to expire, and CN data '0' indicative of congestion recovery is written onto the PT field of the header of a passing data cell (S609). Unless the queue length Q is smaller than the threshold TH1, the congestion is judged not to be recovered, and the control is returned to the main control flow as it is.

Figure 7:
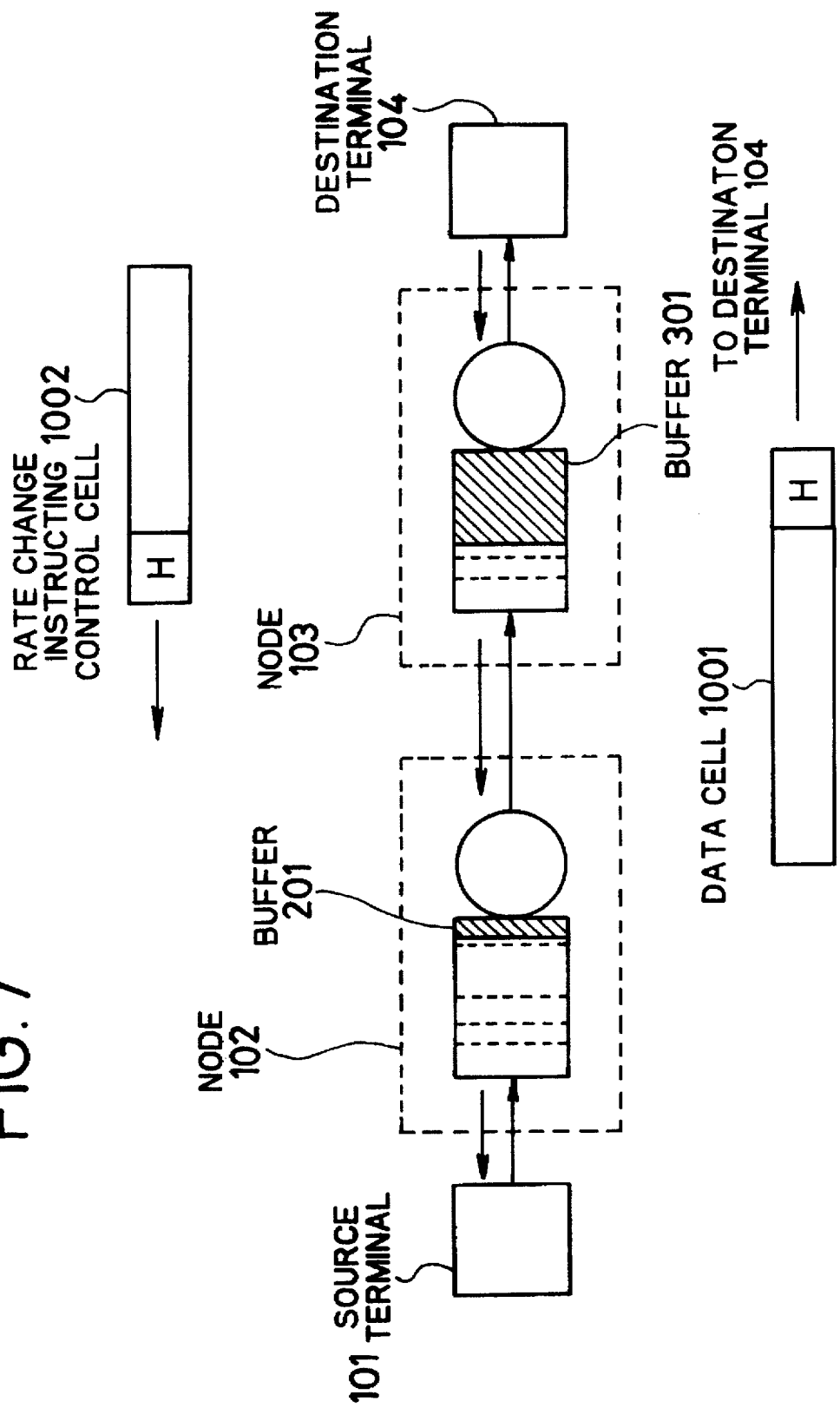
FIG. 7 is a schematic block diagram illustrating a decrease operation of a transmission rate in the first embodiment.

Referring to FIG. 7, the operation of the network system is illustrated when the queue length Q of the buffer 201 in the node 102 is smaller than the threshold TH1, and the queue length Q of the buffer 301 in the following node 103 is equal to or greater than the threshold TH2 but is smaller than the threshold TH4. Since the node 102 is in a state without congestion, data cells to be transmitted by the cell transmitter 202 are transferred to the node 103 with the CN data in the cell header being kept at an initial value, that is, congestion recovery '0' (YES in the step S601 and NO in the step S608 in FIG. 6).

In the node 103, the queue length Q exceeds the threshold TH2, so that the CN data write controller 304 writes CN data '1' indicative of congestion onto the PT field of the header of a data cell 1001 to be transmitted by the cell transmitter 302, and transfers it to the destination terminal 104. In the destination terminal 104, the CN data extractor 502 extracts the CN data from the header of the received data cell 1001. If the congestion state detector 503 determines that the value of the CN data is '1', a control cell generator 504 transmits to the source terminal 101 a control cell 1002 having control information which is to decrease the transmission rate. It is herein noted that the transmission timing of the control cell 1002 may be limited by a predetermined filter time T, as described later. The control cell 1002 is transmitted to the source terminal 101 through the control cell transfer controllers 307 and 207 in the nodes 103 and 102.

In the source terminal 101, after receiving from the destination terminal 104 the control cell which instructs the transmission rate to be decreased, the transmission rate controller 404 controls the cell transmitter 402 to lower the transmission rate of data cells.

As the congestion of the node 103 is moderated to permit the queue length Q to be smaller than the threshold TH1, the CN data write controller 304 writes CN data '0' indicative of congestion recovery into the header of a data cell to be transmitted (S609 in FIG. 6), and transmits it to the destination terminal 104. Receiving such a data cell, the destination terminal 104 transmits a control cell which instructs the transmission rate to be increased to the source terminal 101. According to the control cell, the source terminal 101 increases the transmission rate of data cells.

Figure 8:
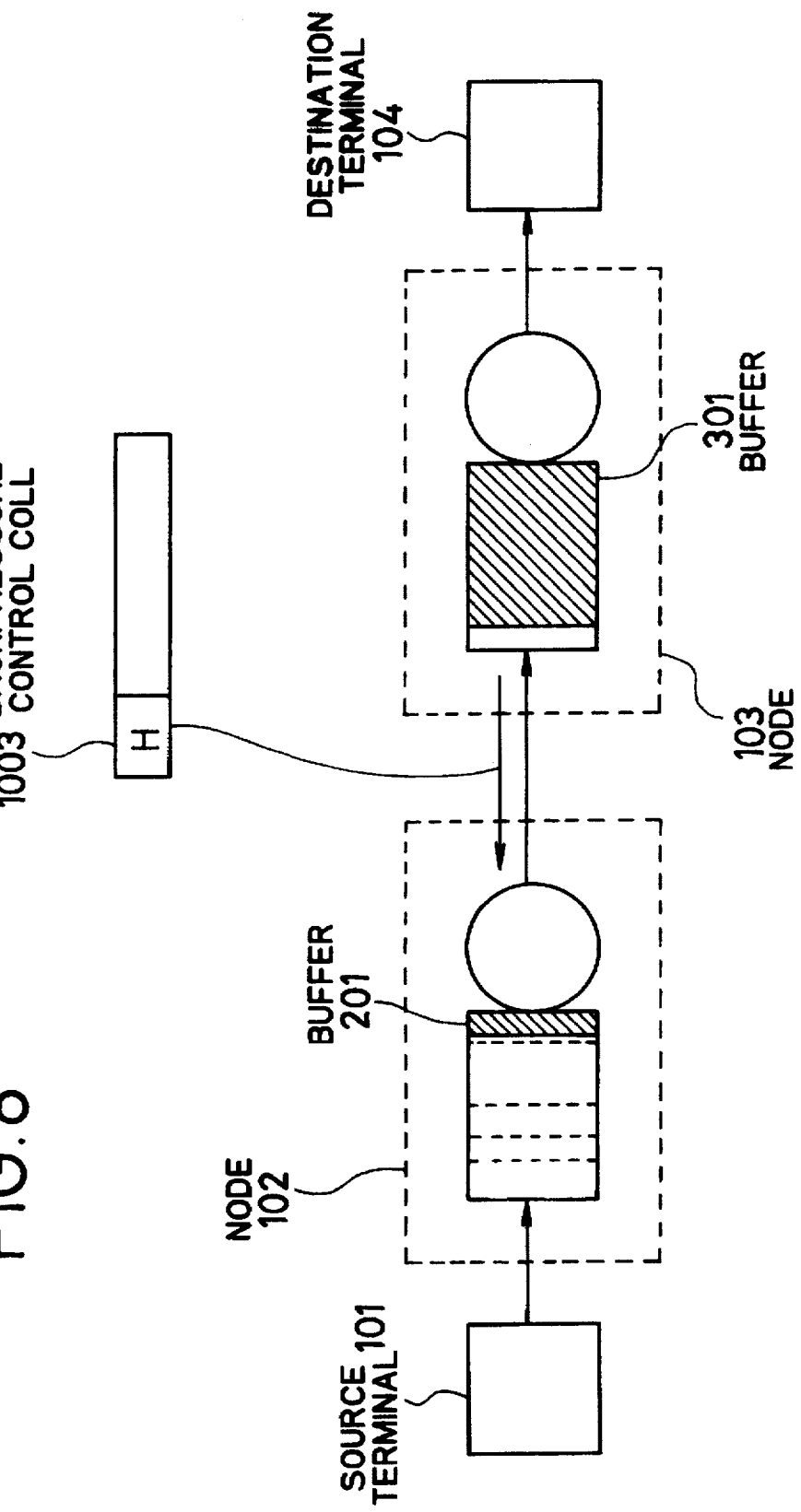
FIG. 8 is a schematic block diagram illustrating a halt operation of the transmission in the first embodiment.

Referring to FIG. 8, the operation is illustrated when the queue length Q becomes greater than the threshold TH4. With the congestion state, the congestion detector 303 in the node 103 instructs the backpressure controller 305 to transmit all preceding nodes connected to the node 103 a backpressure control cell 1003 which instructs the transmission to be temporarily halted (S601–S604 in FIG. 6).

Receiving the backpressure control cell 1003, the traffic controller 206 in the node 102 which is one of the preceding nodes controls the cell transmitter 202 such that the transmission of the data cells to the node 103 is temporarily halted. In other preceding nodes (not illustrated), the data cell transmission to the node 103 is likewise halted.

Once the queue length Q of the node 103 is decreased to the threshold TH3, the backpressure controller 305 transmits a transmission restart control cell to all preceding nodes (S607 in FIG. 6). Hereby, the traffic controller 206 in the node 102 controls the cell transmitter 202 such that the cell transmission to the node 103 is restarted.

Referring to FIG. 9, there is illustrated transmission timing of a control cell which instructs the destination terminal to change the transmission rate. Filter time T is previously set in the control cell generator 504 in the destination terminal 104. The destination terminal 104, even if it continuously receives congestion notification cells or congestion recovery cells, does not transmit a rate change control cell until the filter time T elapses after transmitting a previous rate change control cell. The destination terminal 104 transmits the rate change control cell to the source terminal 101 in response to a congestion notification cell or a congestion recovery cell received after the lapse of the filter time T. As understood from FIG. 9, the destination terminal 104, even if many cells each containing congestion notification data are received during the filter time T1, transmits the rate decrease control cell 1002 only for the first cell 1001. Thereafter, it does not transmit any rate change control cell even if cells come over until the filter time T1 elapses. The destination terminal 104 transmits the transmission rate decrease control cell 1002 to the source terminal 101 once the data cell 1001 comes into in a filter time T2 following the filter time T1. Thereafter, it does not transmit any rate change control cell for cells which come over until the filter time T2 elapses whatever those cells are. Upon receipt of a data cell indicative of the congestion recovery in another filter time T3, the destination terminal 104 transmits a rate increase control cell for the received data cell to the source terminal 101. Thereafter, it does not transmit any rate change cell even if data cells come over until the filter time T3 elapses.

Referring to FIG. 10, a second embodiment of the present invention is illustrated. As in the first embodiment illustrated in FIG. 1, a virtual channel for data transfer is assumed to be established between the source terminal 101 and the destination terminal 104. Although the virtual terminal is formed through a plurality of ATM nodes in the ATM network, two nodes 110 and 111 among those are herein illustrated. For simplicity of the drawing, there are omitted other nodes connected with the nodes 110 and 111 through links, and are also omitted other components such as a cell reception processor and switches in the ATM node.

The nodes in the ATM network have the same circuit arrangement. Described the node 110 as an example, a buffer 211 of the node 110 stores data cells which are received from preceding nodes or the source terminals and are waiting to be transmitted to following nodes or the destination terminals. The buffer 211 represents buffers associated with a data cell queue in the node 110, which may be a common buffer, input buffers or output buffers. The buffer 211 is assumed in the following description to store data cells transferred through the virtual channel established between the source terminal 101 and the destination terminal 104. Data cells are read out from the buffer 211 and are transferred from the transmitter 212 to the following node 111.

A queue length of the buffer 211 is monitored by the congestion detector 213. The congestion detector 213 generates a congestion detection signal by comparing the queue length to four thresholds TH10–TH40 set in advance. The control cell generator 214 transmits a rate change control cell to the source terminal 101 according to the congestion detection signal. A backpressure controller 215 transmits a backpressure control cell indicative of temporary transmission halt to previous nodes or the source terminals according to the congestion detection signal.

Receiving the backpressure control cell from the following node 111, a traffic controller 216 outputs a control signal of temporarily halting the data cell transmission to the cell transmitter 212. A control cell transfer controller 217, receiving a rate change control cell from the following node 111, transfers the rate change control cell to the source terminal 101 through the control cell generator 214.

As illustrated in FIG. 11, four thresholds TH10–TH40 of the buffer are previously determined in each node. The threshold TH10 has a value for judging congestion recovery, the threshold TH20 a value for judging congestion, the threshold TH30 for judging transmission restart, and the threshold TH40 for judging transmission halt. These thresholds satisfy the following relationship: TH10 =<TH20<TH30=<TH40.

Figure 12:
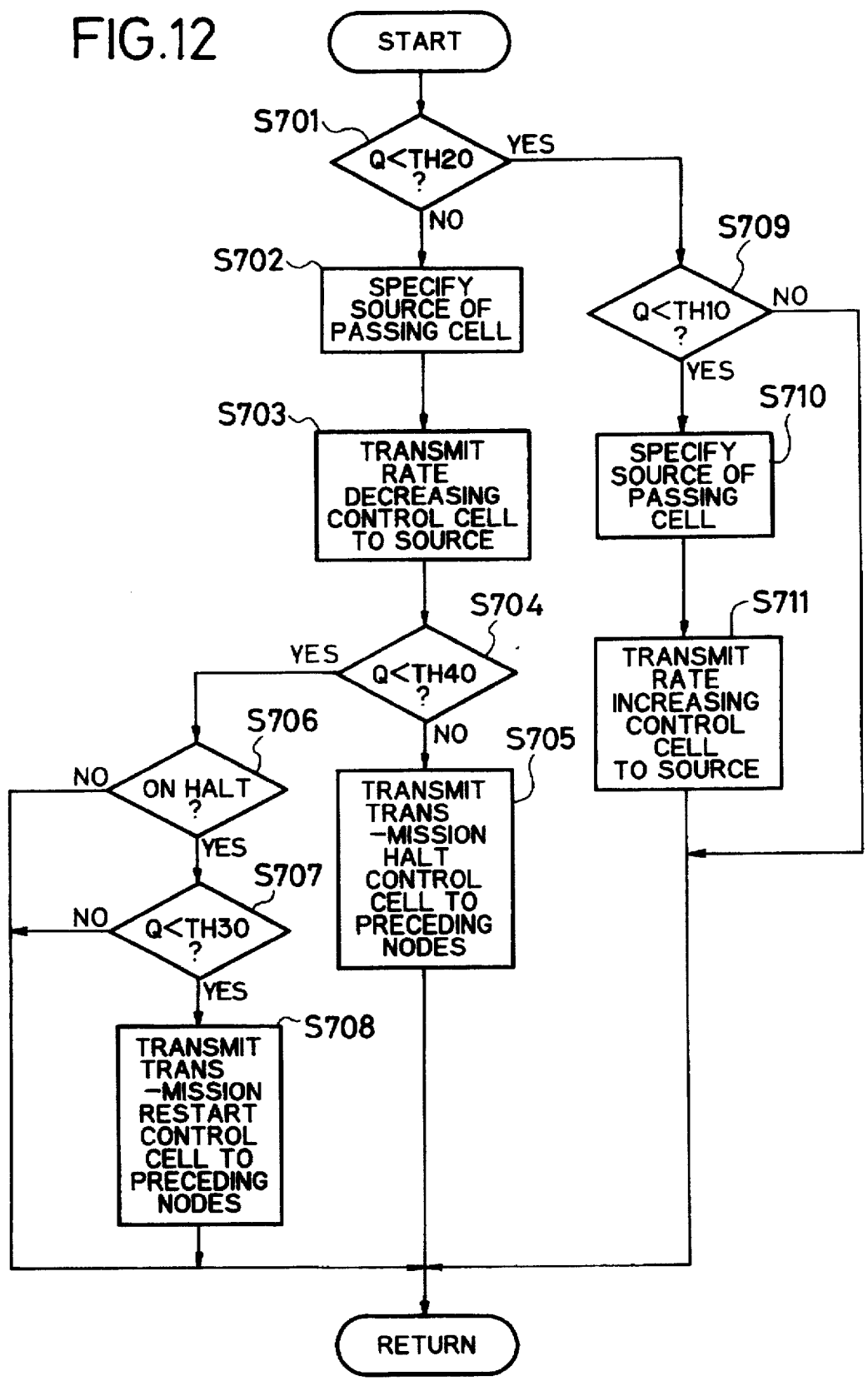
FIG. 12 is a flow chart illustrating a congestion control method according to the second embodiment of the present invention.

Referring to FIG. 12, an operation of each node in the present embodiment will be described. It is noted that a control flow illustrated in FIG. 12 is a subroutine of a main flow (not shown) in each node, which is repeatedly executed at predetermined intervals.

In a certain node, the congestion detector checks whether or not the queue length Q of data cells stored in the buffer is smaller than the threshold TH20 in step S701. If the queue length Q is not smaller than the threshold TH20, the congestion detector judges the node to be in a congestion state, specifies the source terminal from the header of a data cell passing through the node (S702), and further transmits a control cell for instructing the source terminal to decrease its transmission rate from the control cell generator to the source terminal (S703).

Subsequently, the congestion detector checks whether or not the queue length Q is smaller than the threshold TH40 (S704). If the queue length Q is not smaller than the threshold TH40, the congestion detector judges that excessive congestion occurs and the backpressure controller transmits a transmission halt (or backpressure) control cell to all preceding nodes or source terminals (S705).

If the queue length Q is smaller than the threshold TH40 (YES in step S704), it is checked whether or not the transmission is on halt (S706).

If the transmission is on halt, it is further checked whether or not the queue length Q is smaller than the threshold TH30 (S707). If the queue length Q is smaller than the threshold TH30, a transmission restart control cell is transmitted to all preceding nodes in order to release the transmission halt (S708). If the transmission is on halt (NO in step S706), the control is returned to the main control flow with the processing in step S703 being continued and is started in the next timing from step S701. If the queue length Q is not smaller than the threshold TH30 (NO in step S707), the control is returned to the main control flow with the transmission being kept on halt.

If the queue length Q is smaller than the threshold TH20 (YES in step S701), it is checked whether or not the queue length Q is smaller than the threshold TH10 (S709). If the queue length Q is smaller than the threshold TH10, the congestion is decided to be relieved and the source terminal is specified from the header of a data cell passing through the node (S710), and a transmission increase control cell is transmitted from the control cell generator to the source terminal (S711).

Referring to FIG. 13, an operation of the network system is illustrated where a queue length of the buffer 211 in the node 110 is smaller than the threshold TH10 and a queue length of the buffer 311 in the following node 111 is greater than the threshold TH20 but is smaller than the threshold TH40. Since the node 110 is in no congestion state, data cells are transferred from the cell transmitter 212 to the following node 111. In the node 111, the queue length Q exceeds the threshold TH20, so that the control cell generator 314 generates a rate decreasing control cell 2002 and sends it back to the preceding node 110 (S703 in FIG. 12). The control cell 2002 is transferred to the source terminal 101 through the preceding node 110, and the rate controller 404 in the source terminal 101 controls the cell transmitter 402 such that the transmission rate of data cells is decreased. It is noted herein that data cells 2001 stored in the buffer 311 continue to be transferred to the destination terminal 104.

When the congestion of the node 111 is relieved so that the queue length Q is smaller than the threshold TH10, the control cell generator 314 transmits a rate increasing control cell 2002 to the preceding node 110 (S711 in FIG. 12). The control cell 2002 is transferred to the source terminal 101 through the preceding node 110, and the rate controller 404 in the source terminal 101 controls the cell transmitter 402 such that the transmission rate of the data cell is increased to the predetermined rate.

For the transmission halt when the queue length Q in the node 111 exceeds the threshold TH40 and for the transmission restart when the queue length becomes less than the threshold TH30, description thereof is omitted because of their operations being identical to those in the first embodiment.

What is claimed is:

1. A congestion control method in a network wherein information blocks are asynchronously transferred through a plurality of channels, each channel being set up between a source terminal and a destination terminal via a plurality of nodes, the terminals and the nodes each being a stage in a channel, the method comprising the steps of:

at each one node of the plurality of nodes, (a) monitoring a queue length of information blocks to be transferred from the one node, where the queue length is a number of information blocks stored at the one node;

(b) comparing the queue length with a first threshold value and a second threshold value, the first threshold value being smaller than the second threshold value;

(c) stopping a preceding stage in the channel from transmitting information blocks to the one node when the queue length is larger than the second threshold value; and at the source terminal, (d) decreasing a rate of information block transmission on at least one of said channels from a first transmission rate to a second transmission rate, when at least one of the plurality of nodes on said at least one channel has a queue length larger than the first threshold value, and transmitting information blocks at the second transmission rate.

2. The congestion control method according to claim 1, further comprising the steps of:

at the one node, (e) adding congestion notification data to information blocks passing through the one node and directed to the destination terminal when the queue length is larger than the first threshold value;

at the destination terminal, (f) transmitting a rate descreasing information block to the source terminal, the rate decreasing information block being formed based on the congestion notification data; and (g) performing the step (d) in response to the rate descreasing information block.

3. The congestion control method according to claim 2, wherein, in the step (f), the rate decreasing information block is transmitted once every predetermined time period.

4. The congestion control method according to claim 2, further comprising the steps of:

at each one node, (h) comparing the queue length with a minimum threshold value which is smaller than the first threshold value;

(i) adding congestion recovery notification data to information blocks passing through the one node and directed to the destination terminal when the queue length is smaller than the minimum threshold value;

at the destination terminal, (j) transmitting a rate increasing information block to the source terminal, the rate increasing information block being formed based on the congestion recovery notification data; and at the source terminal, (k) increasing the rate of information block transmission in response to the rate increasing information block.

5. The congestion control method according to claim 4, wherein, in the step (j), the rate increasing information block is transmitted once every predetermined time period.

6. The congestion control method according to claim 1, further comprising the steps of:

at each one node, comparing the queue length with a third threshold value which is smaller than the second threshold value but larger than the first threshold value; and restarting the preceding stage transmitting information blocks to each one node when the queue length is reduced from more than the second threshold value to less than the third threshold value.

7. The congestion control method according to claim 2, further comprising the steps of:

at each one node, comparing the queue length with a third threshold value which is smaller than the second threshold value but larger than the first threshold value; and restarting the preceding stage transmitting information blocks to the one node when the queue length is reduced from more than the second threshold value to less than the third threshold value.

8. The congestion control method according to claim 4, further comprising the steps of:

at each one node, comparing the queue length with a third threshold value which is smaller than the second threshold value but larger than the first threshold value; and restarting the preceding stage transmitting information blocks to the one node when the queue length is reduced from more than the second threshold value to less than the third threshold value.

9. The congestion control method according to claim 1, further comprising the steps of:

at each one node, transmitting a rate decreasing information block to the source terminal when the queue length is larger than the first threshold value; and at the source terminal, performing the step (d) in response to rate decreasing information block.

10. The congestion control method according to claim 9, further comprising the steps of:

at each one node, comparing the queue length with a minimum threshold value which is smaller than the first threshold value;

transmitting a rate increasing information block to the source terminal when the queue length is smaller than the minimum threshold value; and at the source terminal, increasing the rate of information block transmission in response to the rate increasing information block.

11. The congestion control method according to claim 9, further comprising the steps of:

at each one node, comparing the queue length with a third threshold value which is smaller than the second threshold value but larger than the first threshold value; and restarting the preceding stage transmitting information blocks to the one node when the queue length is reduced from more than the second threshold value to less than the third threshold value.

12. The congestion control method according to claim 10, further comprising the steps of:

at each one node, comparing the queue length with a third threshold value which is smaller than the second threshold value but larger than the first threshold value; and restarting the preceding stage transmitting information blocks to the one node when the queue length is reduced from more than the second threshold value to less than the third threshold value.

13. The congestion control method according to claim 1, wherein the preceding stage is the source terminal or a prior note adjacent to the one node through the channel.

14. A network system wherein information blocks are asynchronously transferred through a plurality of channels, each channel being set up between a source terminal and a destination terminal via a plurality of nodes, the terminals and the nodes each being a stage in a channel, the network system comprising:

(a) a plurality of nodes;

(b) a source terminal;

(c) a destination terminal;

(d) each one node of the plurality of nodes comprises:

monitoring means for monitoring a queue length of information blocks to be transferred from the one node, where the queue length is the number of information blocks stored at the one node;

comparing means for comparing the queue length with a first threshold value and a second threshold value, the first threshold value being smaller than the second threshold value;

addition means for adding congestion notification data to information blocks passing through the one node and directed to the destination terminal when the queue length is larger than the first threshold value; and stopping means for stopping a preceding stage from transmitting information blocks to the one node when the queue length is larger than the second threshold value, (e) the destination terminal comprises:

transmission means for transmitting a rate decreasing information block to the source terminal, the rate decreasing information block being formed based on the congestion notification data, and (f) the source terminal comprises:

decreasing means for decreasing the rate of information block transmission on at least one of said channels from a first transmission rate to a second transmission rate, in response to the rate decreasing information block, whereby information blocks are transmitted at the second transmission rate.

15. The network system according to claim 14, wherein the destination terminal transmits the rate decreasing information block once every predetermined time period.

16. The network system according to claim 14, wherein:

each one node further comprises:

second comparing means for comparing the queue length with a minimum threshold value which is smaller than the first threshold value; and second addition means for adding congestion recovery notification data to information blocks passing through the one node directed to the destination terminal when the queue length is smaller than the minimum threshold value;

the destination terminal further comprises:

second transmission means for transmitting a rate increasing information block to the source terminal, the rate increasing information block being formed based on the congestion recovery notification data; and the source terminal further comprises:

increasing means for increasing the rate of information block transmission in response to the rate increasing information block.

17. The network system according to claim 14, wherein:

each one node further comprises:

third comparing means for comparing the queue length with a third threshold value which is smaller than the second threshold value but larger than the first threshold value; and restarting means for restarting the preceding stage transmitting information blocks to the one node when the queue length is reduced from more than the second threshold value to less than the third threshold value.

18. The network system according to claim 14, where the destination terminal transmits the rate decreasing information block once every predetermined time period.

19. The network system according to claim 16, wherein the destination terminal transmits the rake increasing information block once every predetermined time period.

20. The network system according to claim 14, wherein the preceding stage is the source terminal or a prior note adjacent to the one node through the channel.

21. A network system wherein information blocks are asynchronously transferred through a plurality of channels, each channel being set up between a source terminal and a destination terminal via a plurality of nodes, the terminals and the nodes each being a stage in a channel, the network system comprising:

(a) a plurality of nodes;

(b) a source terminal;

(c) a destination terminal;

(d) each one node of the plurality of nodes comprises:

monitoring means for monitoring a queue length of information blocks to be transferred from the one node, where the queue length is the number of information blocks stored at the one node;

comparing means for comparing the queue length with a first threshold value and a second threshold value, the first threshold value being smaller than the second threshold value;

transmission means for transmitting a rate decreasing information block to the source terminal when the queue length is larger than the first threshold value; and stopping means for stopping a preceding stage in the channel from transmitting information blocks to the one node when the queue length is larger than the second threshold value, and (e) the source terminal comprises:

decreasing means for decreasing the rate of information block transmission on at least one of said channels from a first transmission rate to a second transmission rate, in response to the rate decreasing information block, whereby information blocks are transmitted at the second transmission rate.

22. The network system according to claim 21, wherein:

each one node further comprises:

second comparing means for comparing the queue length with a minimum threshold value which is smaller than the first threshold value; and second transmission means for transmitting a rate increasing information block to the source terminal when the queue length is smaller than the minimum threshold value, and the source terminal further comprises:

second increasing means for increasing the rate of information block transmission in response to the rate increasing information block.

23. The network system according to claim 21, wherein:

each one node further comprises:

third comparing means for comparing the queue length with a third threshold value which is smaller than the second threshold value but larger than the first threshold value; and restarting means for restarting the preceding stage transmitting information blocks to the one node when the queue length is reduced from more than the second threshold value to less than the third threshold value.

24. The network system according to claim 21, wherein the preceding stage is the source terminal or a prior note adjacent to the one node through the channel.

* * * * *